United States Patent
Kumar

(10) Patent No.: US 10,649,610 B2
(45) Date of Patent: *May 12, 2020

(54) DETECTING CONTENT TYPES AND WINDOW REGIONS IN COMPOSITED DESKTOP FRAME BUFFER

(71) Applicant: CITRIX SYSTEMS, INC., Fort Lauderdale, FL (US)

(72) Inventor: Sandeep Kumar, Cupertino, CA (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/127,531

(22) Filed: Sep. 11, 2018

(65) Prior Publication Data

US 2019/0012044 A1  Jan. 10, 2019

Related U.S. Application Data

(63) Continuation of application No. 14/614,759, filed on Feb. 15, 2015, now Pat. No. 10,114,517.

(51) Int. Cl.
  *G06F 3/048* (2013.01)
  *G06F 3/0481* (2013.01)
  (Continued)

(52) U.S. Cl.
  CPC ........... *G06F 3/0481* (2013.01); *H04N 19/12* (2014.11); *H04N 19/136* (2014.11); *H04N 19/17* (2014.11);
  (Continued)

(58) Field of Classification Search
  None
  See application file for complete search history.

(56) References Cited

U.S. PATENT DOCUMENTS 6,573,915 B1 * 6/2003 Sivan ............... G09G 5/14
                                                715/781
8,074,162 B1   12/2011 Cohen
(Continued)

OTHER PUBLICATIONS

Jorge Gonzalez-Conejero et al., Encoding Scheme for Multi-Component Images Containing No-Data Regions, Nov. 1, 2009, IEEE, pp. 1897-1900 (Year: 2009).*

(Continued)

*Primary Examiner* — Tam T Tran
(74) *Attorney, Agent, or Firm* — Allen, Dyer, Doppelt + Gilchrist, PA

(57) ABSTRACT

A computing device may include at least one processor configured to obtain a display frame, determine at least one modified region of the display frame, determine at least one application having an application window corresponding to the at least one modified region of the display frame, and determine a difference between the application window and the at least one modified region to define a difference region. The processor may be further configured to identify a content type of the difference region of the display frame from among a plurality of different content types, select a given encoding type for at least a portion of the display frame based on the identified content type of the difference region, and encode the at least one portion of the display frame using the given encoding type.

15 Claims, 11 Drawing Sheets

(51) Int. Cl.
*H04N 19/12* (2014.01)
*H04N 19/136* (2014.01)
*H04N 19/17* (2014.01)
*G06F 3/0488* (2013.01)
*G06F 3/0484* (2013.01)
*G06F 3/0482* (2013.01)

(52) U.S. Cl.
CPC .......... *G06F 3/0482* (2013.01); *G06F 3/0488* (2013.01); *G06F 3/04842* (2013.01); *G06F 2203/04803* (2013.01)

(56) References Cited

U.S. PATENT DOCUMENTS

| | | |
|---|---|---|
| 2002/0006116 A1 | 1/2002 | Burkhart |
| 2004/0170155 A1 | 9/2004 | Omar et al. |
| 2006/0090169 A1 | 4/2006 | Daniels et al. |
| 2006/0128376 A1 | 6/2006 | Alexis |
| 2006/0209949 A1* | 9/2006 | Fukuta ................ H04N 19/172 375/240.03 |
| 2010/0277510 A1 | 11/2010 | Karaoguz et al. |
| 2012/0183039 A1* | 7/2012 | Rajamani ............. H04N 19/124 375/240.02 |
| 2012/0268480 A1 | 10/2012 | Cooksey et al. |
| 2014/0122566 A1* | 5/2014 | Spracklen ........... H04L 43/0829 709/203 |
| 2016/0180798 A1 | 6/2016 | Bathiche et al. |

OTHER PUBLICATIONS

Zhongyuan Lai et al., Arbitrary Directional Edge Encoding Schemes for the operational Rate-Distortion Optimal Shape Coding Framework, Mar. 1, 2010, IEEE Computer Society, pp. 20-29 (Year: 2010).*

Kim et al. "A selective Video Encryption for the Region of Interest in Scalable Video Coding" 2007, IEEE (Year: 2007)

Chen et al. "Coding of Subregions for Content-Based Scalable Video" Feb. 1997, IEEE Transcations on circuits and systems for video technology, vol. 7, No. 1, pp. 256-260.

* cited by examiner

DETECTING CONTENT TYPES AND WINDOW REGIONS IN COMPOSITED DESKTOP FRAME BUFFER

RELATED APPLICATIONS

This application is a continuation of U.S. application Ser. No. 14/614,759 filed Feb. 5, 2015, which is hereby incorporated herein in its entirety by reference.

BACKGROUND

Modern computing systems are capable of running a large variety of software applications and platforms. A computing system can provide an operating system allowing applications executing on the computing system to access and interact with hardware components of the computing system. Through this interaction, the software applications can accept user input and provide output, which can be presented to the user through a graphical user interface presented on a display device. Additionally, the output can be forwarded to a remote computing device.

Remote computing technologies allow users to use a computing system without being physically located at the computing system. Through remote access, users can connect to a remote computing system over a public or private network. The user can use a local computing system to send input to the remote computing system and the remote computing system can respond. Although not physically present at the remote computing system, the user can interact with the remote computing system as though the user was using the system directly.

Additionally, virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, virtual machines running on a same host computer can each have its own operating system. For example, a computer that is running Microsoft Windows operating system may host a virtual machine that simulates a computer running a Linux operating system, based on which Linux-based software can be executed.

Further, virtualization technologies can provide remote access to computer resources across public or private networks. Users can use a variety of clients to access a virtual desktop or applications running on a host computer in the virtualized environment. These clients can be directly connected to the host computer or they can connect to the virtualized environment through a public or private network. The client can capture user input and transfer it across the network to the host computer's virtual environment. The application receiving the user input can respond by performing some action and presenting a response to the user. Virtualization allows multiple users to share hardware resources instead of requiring that each user connect to a dedicated remote computing system.

Applications running in a remote, local, or virtualized computing environment can respond to user input updating the output for display on a display device. An application can provide the operating system with instructions to update the graphical user interface. The operating system can than process the commands and display the update on a graphical interface. In many current and past system architectures, applications could write directly to a frame buffer through the operating system. In addition to the frame to be displayed, the operating system could provide the raw draw commands and additional information about the updated display frame such as the content type of the displayed content, the modified region of the output display frame, and other metadata about the output display frame. This information was useful for remote technologies because instead of simply sending a bandwidth intensive graphic representing a visual display over a network, the system could combine the raw draw commands and the additional information about the display frame to optimize data sent to the remote computing environment. This optimization allowed for a much better user experience while limiting the network bandwidth required for remote computing.

Modern operating systems have moved away from past display mechanisms, relying instead on offloading rendering of the user interface to graphics processing units. As a result, the operating system receives updates from the applications, composites those updates into a display frame using the graphics processing unit, and provides a graphic or bitmap representing the composited frame to the display device or graphics system. As a result the graphics system of the computing environment only receives a final composited display frame without any additional metadata or draw commands. Accordingly, a graphics driver forwarding the display to a remotely connected user can no longer benefit from the previously provided information. This has necessitated new mechanisms for optimizing the transmission of the user display to clients.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide technologies and techniques for detecting content types and window regions existing in a composited display frame. These technologies operate in both a virtual and non-virtual environment allowing for the optimization of display output that is forwarded to remote clients. These optimizations provide significant benefits in the transmission of visual data across public and private networks. Not only do these optimizations improve the user experience for remote users, these optimizations result in a substantial reduction in the required network infrastructure and bandwidth required to allow for remote computing.

The technologies and techniques described herein allow for specific encoding and compression mechanisms based on the contents of different applications running on a computer system. The specific encodings for each application window can be tailored to the needs of that specific window content reducing the inefficiency and poor user experience resulting from choosing only one encoding scheme for an entire display frame. The technologies described herein can obtain a display frame, determine at least one modified region of the display frame, determine at least one application with an application window corresponding to the modified regions of the display frame, identify content types associated with the contents of the modified region based on the corresponding applications and determine an encoding for part or all of the display frame based on the content type. By basing encoding types on the content itself, the technologies described can improve overall user quality while at the same time reducing bandwidth and networking hardware necessary for remote computing.

Figure 1:
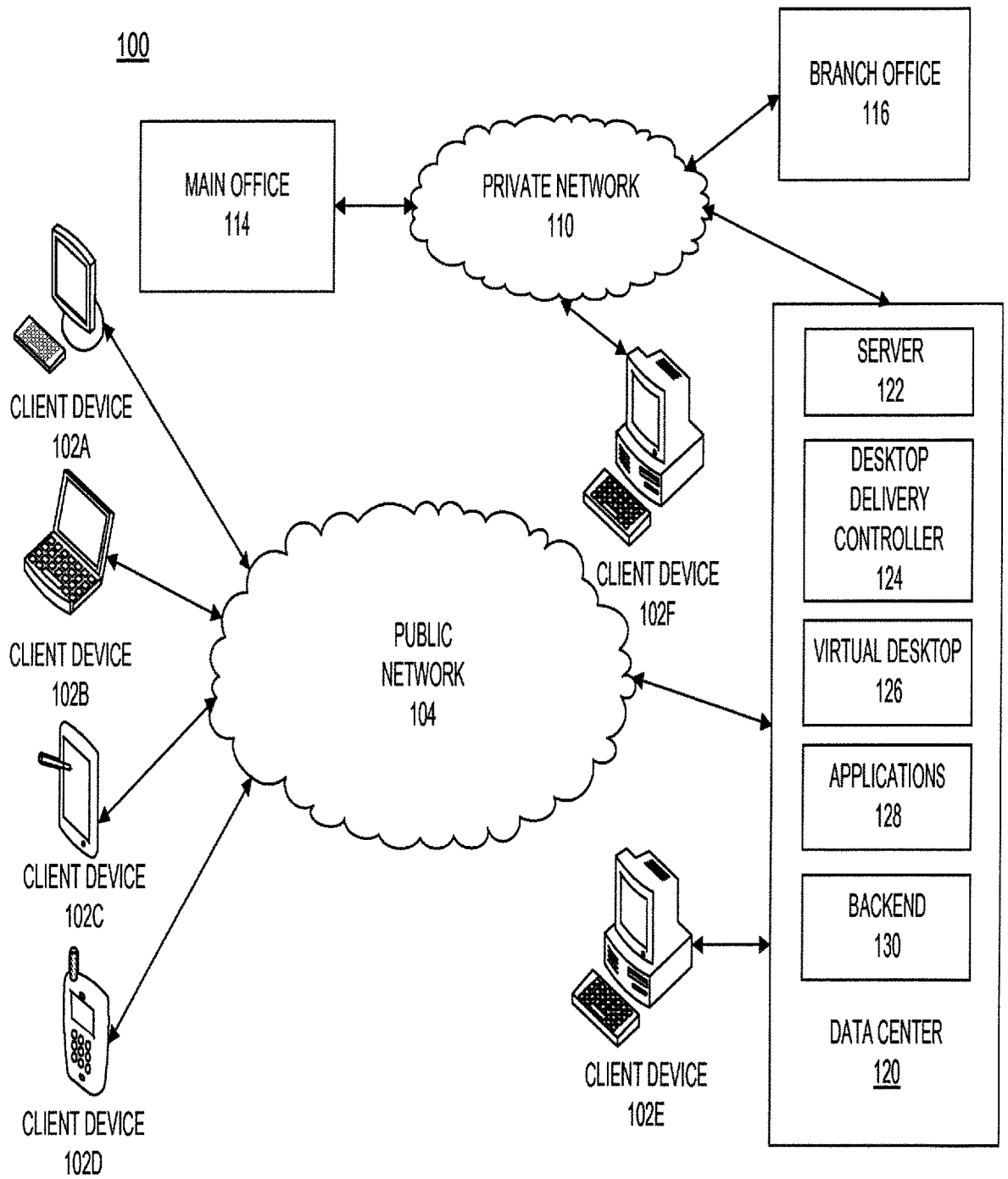
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, a main office 114, a branch office 116, and a data center 120.

One or more client devices 102A-F (collectively as 102) are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). In some embodiments, a main office 114 and a branch office 116 can also include one or more client devices that are similar to client devices 102A-F. Main office 114 can be located, for example, in a principal place of business of a company. Branch office 116 can be located, for example, remote to main office 114. In some embodiments, the client devices of main office 114 and branch office 116 can also acquire remote services from data center 120 through, for example, private network 110.

When client device 102 communicates through public network 104 or private network 110, a communication link can be established. For example, a communication link can be established by public network 104, thereby providing a client device (e.g., client devices 102A-D) access to data center 120. A communication link can also be established by private network 110, thereby providing client device 102F, main office 114 and/or branch office 116 accesses to data center 120. While client devices 102A-D are portrayed as a computer (e.g., client devices 102A), a laptop (e.g., client device 102B), a tablet (e.g., client device 102C), and a mobile smart phone (e.g., client device 102D), it is appreciated that client device 102 could be any type of device (e.g., such as a smartwatch or any other wearable device) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, a communication subsystem, and a hypervisor creating or managing one or more virtual machines. Server 122 can provide one or more services to an endpoint. These services can include providing one or more applications 128 to one or more endpoints (e.g., client devices 102A-F). For example, one or more applications 128 can include Windows™- or SAP™-based applications and computing resources. Via the communication subsystem, server 122 can communicate with other devices (e.g., client devices 102) through various types of networks (e.g., private network 110 and public network 104).

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 can provide one or more applications 128. Virtual desktops 126 can include hosted shared desktops allowing multiple users to access a single shared remote-desktop-services desktop, virtual desktop infrastructure desktops allowing each user to have their own virtual machine, streaming disk images, a local virtual machine, individual applications (e.g., one or more applications 128), or a combination thereof. Users can interact with one or more of the virtual desktops 126 through client device 102. In some embodiments, virtual desktop 126 can respond to user input by providing an updated visual display forwarded from the virtual desktop to the client device.

Backend system 130 can be a single or multiple instances of computer networking hardware, appliances, or servers in a server farm or a bank of servers. Backend system 130 can interface directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP) server. Backend system 130 can provide data, services, or a combination of both to data center 120, which can then provide that information via varying forms to client devices 102 or branch office 140.

Figure 2A:
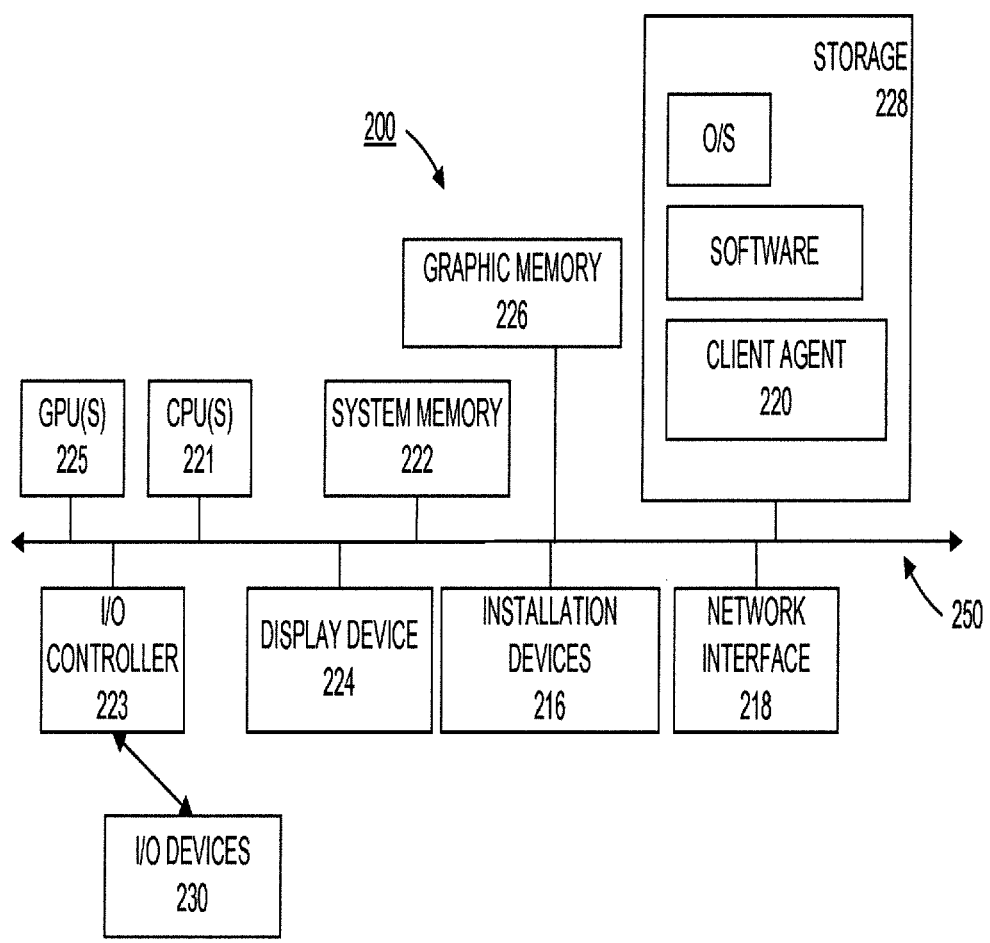
FIGS. 2A-2C are block diagrams of an exemplary computing device, consistent with embodiments of the present disclosure.
Figure 2B:
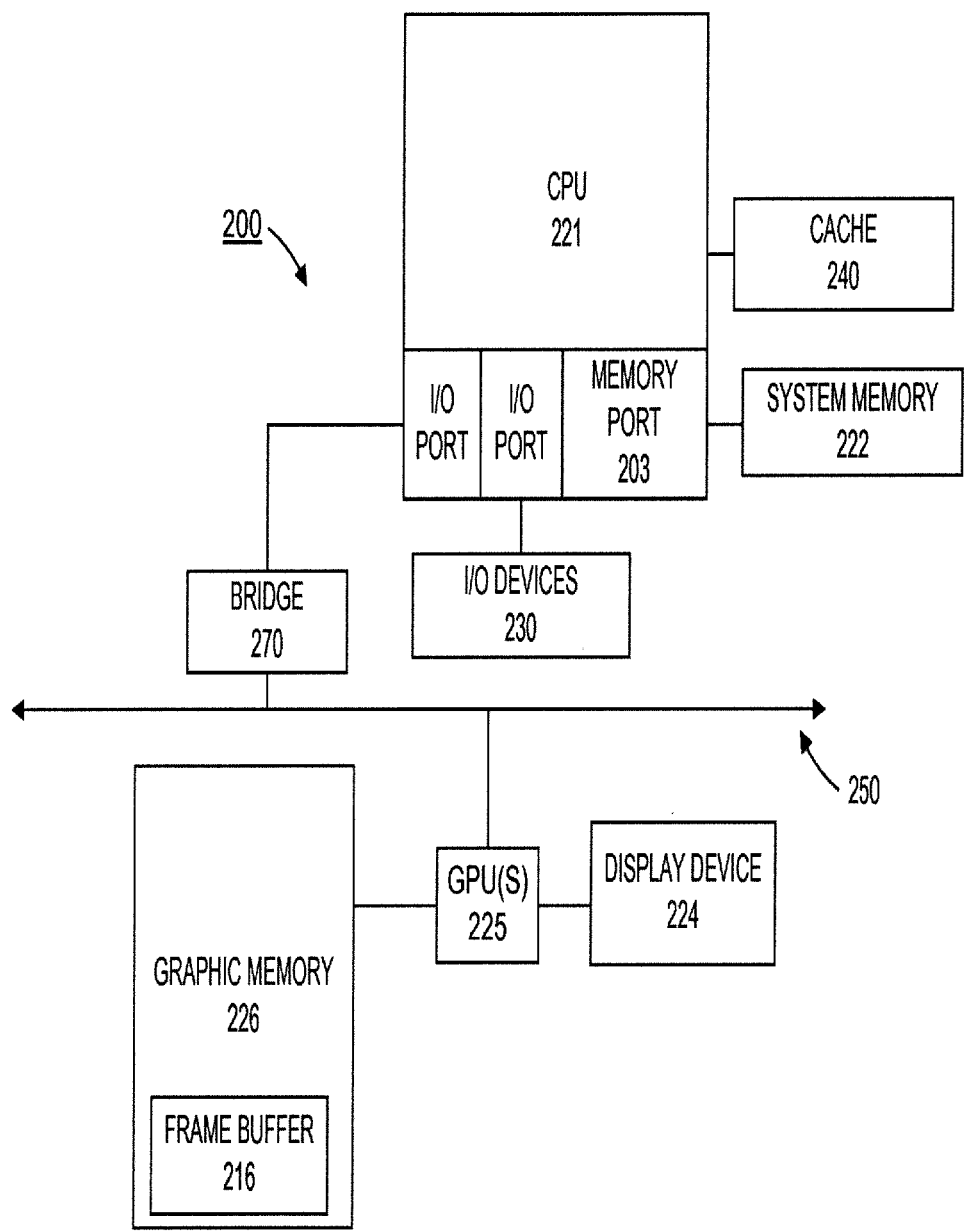
Figure 2C:
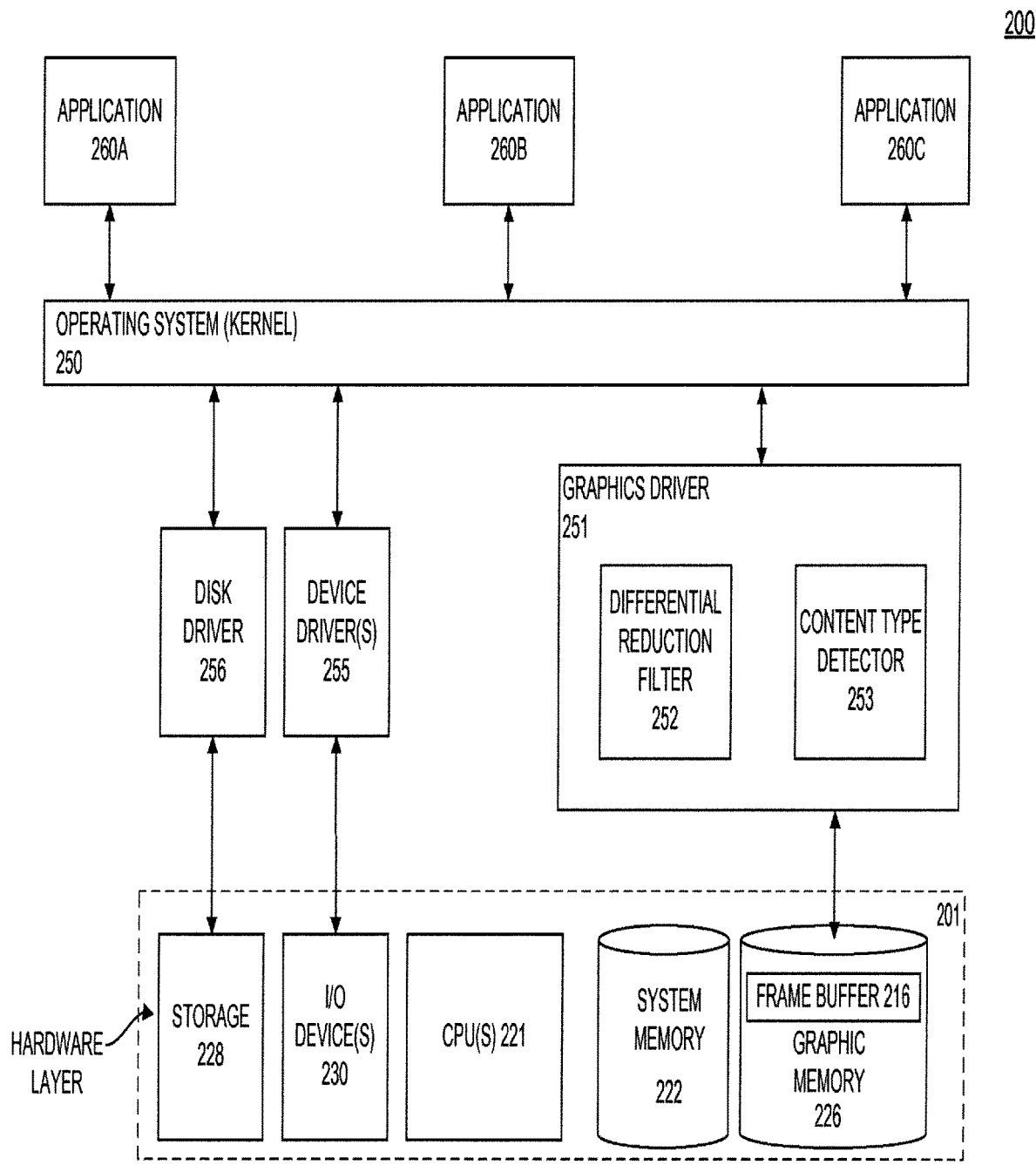

FIGS. 2A-2C are block diagrams of an exemplary computing device 200, consistent with embodiments of the present disclosure. Computing device 200 can be a server, such as server 122 in data center 120 as shown in FIG. 1. As shown in FIG. 2A, computing device 200 can include one or more central processing units (CPUs) 221, one or more graphics processing units (GPUs 225), a system memory 222, and a graphic memory 226. CPUs 221 can be any logic circuitry that responds to and processes instructions fetched from the system memory 222. CPUs 221 can be a single or multiple microprocessors, field-programmable gate arrays (FPGAs), or digital signal processors (DSPs) capable of executing particular sets of instructions stored in a memory (e.g., system memory 222) or a cache (e.g., cache 240). CPUs 221 can also contain a plurality of processor registers for storing variable types of data. For example, these registers can store data, instructions, floating point values, conditional values, and/or addresses for locations in system memory 222. CPU registers can include special purpose registers used to store data associated with the running process such as an instruction pointer, instruction counter, and/or a memory stack pointer.

The system memory 222 can include a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), a flash drive and/or flash memory, processor cache, memory register, or a semiconductor memory. System memory 222 can be one or more memory chips capable of storing data and allowing any storage location to be directly accessed by CPUs 221. System memory 222 can be any type of random access memory (RAM), or any other available memory chip capable of operating as described herein. In the exemplary embodiment shown in FIG. 2A, CPUs 221 can communicate with system memory 222 via a system interface 250.

GPUs 225 can be any type of specialized circuitry that can manipulate and alter memory (e.g., graphic memory 226) to provide and/or accelerate the creation of images stored in a frame buffer (e.g., frame buffer 316 shown in FIG. 23) for output to a display device (e.g., display device 224). GPUs 225 can have a highly parallel structure making them more effective than general-purpose CPUs 221 for algorithms where processing of large blocks of graphical data can be performed in parallel. Furthermore, the functionality of GPUs 225 can also be included in a chipset of in some other type of special purpose processing unit or co-processor.

CPUs 221 can connect to system memory 222 and system interface 250. CPUs 221 can execute programming instructions stored in the system memory 222, operate on data stored in system memory 222 and communicate with the GPUs 225 through the system interface 250, which bridges communication between the CPUs 221 and GPUs 225. In some embodiments, CPUs 221, GPUs 225, system interface 250, or any combination thereof, can be integrated into a single processing unit. GPUs 225 can be capable of executing particular sets of instructions stored in system memory 222 to manipulate graphical data store in system memory 222 or graphic memory 226. For example, GPUs 225 can receive instructions transmitted by the CPUs 221 and processes the instructions in order to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224.

Computing device 200 can also include display device 224 and an input/output (I/O) device 230 (e.g., a keyboard, mouse, or pointing device) connected through an I/O controller 223, both of which communicate via system interface 250. It is appreciated that CPUs 221 can also communicate with system memory 222 and other devices in manners other than through system interface 250, such as through serial communication manners or point-to-point communication manners. Similarly, GPUs 225 can also communicate with graphic memory 226 and other devices in manners other than system interface 250. Furthermore, I/O device 230 can also provide storage and/or an installation medium for computing device 200.

FIG. 2B depicts an embodiment of an exemplary computing device 200 in which CPUs 221 communicates directly with system memory 222 via a memory port 203, and similarly GPUs 225 communicates directly with graphic memory 226. CPUs 221 can communicate with a cache 240 via a secondary bus, sometimes referred to as a backside bus. In some embodiments, CPUs 221 can communicate with cache 240 via system interface 250. Cache 240 typically has a faster response time than system memory 222. In some embodiments, such as the embodiment shown in FIG. 2B, CPUs 221 can communicate directly with I/O device 230 via an I/O port. In further embodiments, I/O device 230 can be a bridge 270 between system interface 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Thunderbolt bus, or a Serial Attached small computer system interface bus.

As shown in FIG. 2B, GPUs 225 can also communicate directly with graphic memory 226 and display device 224. GPUs 225 can communicate with CPUs 221 and other devices through system interface 250. Graphic memory 226 can also include a frame buffer 217. Frame buffer 217 can be a graphic output device that drives a display device (e.g., display device 224) from a memory buffer of graphic memory 226 containing a complete frame of graphical data. Frame buffer 217 can store the final graphic frames, which are to be displayed on display device 224.

As shown in FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; flash drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

In some embodiments, an operating system can execute on the components of computing device 200. The operating system can use a graphics driver to interact with the graphics system (e.g., GPUs 225, graphic memory 226, frame buffer 217, and display device 224). A graphics driver can exist in a virtualized and non-virtualized computing environment. The graphics driver can instruct GPUs 225 to perform operations and store the results in frame buffer 217 for display on display device 224. In some embodiments, instead of displaying the contents of frame buffer 217 on display device 224, the graphics driver can further process the display frames stored in frame buffer 217 and forward the contents of frame buffer 217 to a communicatively coupled (e.g., through network interface 218) computing device (e.g., client 102).

FIG. 2C depicts an embodiment of an exemplary computing device 200.

Computing device 200 can include storage 228, I/O device(s) 230, CPU(s) 221, system memory 222, frame buffer 216, graphic memory 226 as part of a hardware layer 201 (which can be structured as shown in FIGS. 2A-2B). Computing device 200 can execute operating system 250. Additionally, computing device 200 can execute applications 260A-C. Applications 260A-C can use functionality provided by operating system 250 to interact with the hardware layer 201 provided by computing device 200.

Operating system 250 can use device drivers to communicate with components in hardware layer 201. For example, operating system 250 can use disk driver 256 to interact with storage 228, device driver(s) 255 to interact with various I/O devices 230, and graphics driver 253 to interact with frame buffer 216, graphic memory 226, and other aspects of the graphics system (e.g., GPU(s) 225 and display device 224 as shown in FIGS. 2A-2B). Computing device 200 could contain many additional device drivers to facilitate interaction with other hardware not pictured.

Device drivers can further contain sub components that add additional functionality while interacting with the hardware layer. Graphics driver 251 can include differential reduction filter 252 and content type detector 253, both of which can be used for processing updates to a graphical interface for forwarding to and display on a remote client device. For example, applications 260A-C can initiate updates to a graphical display. Operating system 250 can process these updates, composite a display frame, and provide the composited frame to graphics driver 251. Graphics driver 251 can process the display frame using differential reduction filter 252 and content type detector 253 in addition to providing the display frame to frame buffer 216. In some embodiments, graphics driver 251 is a forwarding graphics driver that uses the information provided by differential reduction filter 252 and content type detector 253 to further encode and compress a display frame for sending to a remote computing device.

Differential reduction filter 252 can process a display frame and determine regions of the display that have changed from a previous display frame. Graphics driver 251 can provide the resulting output to the graphics components of hardware layer 201, forward the output to a remote client, or use the output in further processing by content type detector 253.

Content type detector 253 can take the output from differential reduction filter 252 and process the modified regions of the display frame. Content type detector 253 can query operating system 250 and applications 260A-C for information relating to the specific type of content falling with the modified regions provided by differential reduction filter 252. Using this information content type detector 253 can determine areas of the display frame corresponding to specific types of data and provide these determinations to graphics driver 251. In some embodiments, graphics driver 251 uses the output from content type detector 253 to optimally compress the display and send the display frame to a remote computing environment.

Differential reduction filter 252 and content type detector 253 are exemplary components consistent with the present disclosure and described in more detail below. The present disclosure is not limited to these specific embodiments, and components or functionality consistent with the present disclosure can be provided by graphics driver 251 and/or hardware layer 201.

Figure 3:
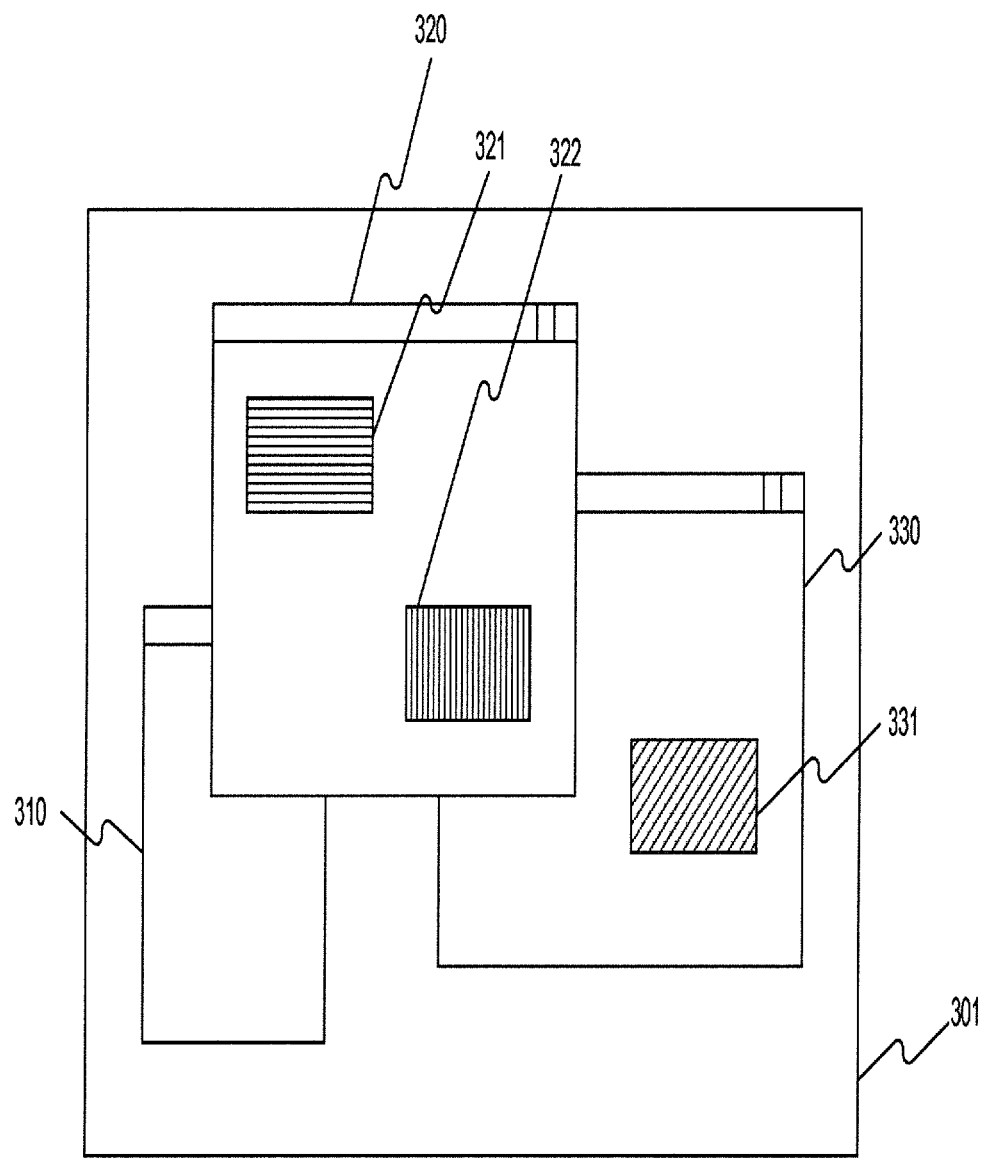
FIG. 3 illustrates an exemplary user desktop, consistent with embodiments of the present disclosure.

FIG. 3 illustrates an exemplary user desktop 301, consistent with embodiments of the present disclosure. User desktop 301 can provide a visual representation of the state of applications running on the computing system. User desktop 301 can be presented on a display device (e.g., display device 224 or a display device attached to remote client device 102). The user can then interact with the system through input devices (e.g., I/O devices 230) and the results of that interaction on user desktop 301 are presented to the user through the display device.

User desktop 301 can contain application windows (e.g., windows 310, 320 and 330) corresponding to applications or processes running on the computing system. These application windows can provide the user with a visual representation of the application. Application windows 310, 320, and 330 can represent a variety of applications. For example, an application can be a web browser, a word processor, a spreadsheet application, an image editor, an instant messaging client, a video player, a music player, or grouping of instructions executing on the computing system. In some embodiments, an application provides multiple application windows. For example application window 320 and application window 310 can represent data for the same application or process. In some embodiments, different application windows can represent the same type of applications. For example application window 320 and application window 330 can both represent a web browser application.

Application windows can further contain content and various sub components (e.g., content items 321, 322, and 331) specific to the application represented by the application window. Content items can be logical groupings of content within an application window having a particular content type. An application can contain many content items having the same or different content types. In some embodiments, a content item, for example, a text entry box, can have consistent visual representation and behavior across application windows. Further, a content item can have visual representations and behavior specific to the application represented by the containing application window.

For example, application window 320 can represent a web browser. The web browser application can, for example, use application window 320 to display the rendered text of a website. Further, for example, application window 320 can contain content item 321. In the context of a web browser, for example, content item 321 can be an image or video related to the web page being displayed in application window 320. Further, for example, content item 322 can be another image or video related to the web page or a different content item such as an interactive quiz or advertisement. In some embodiments content items 321 and 322 are the same type of content item such as in image. Content items 321 and 322 can be different types of content items. Further, application windows can contain custom content items specific to a type of application. For example, application window 320 representing a web browser application can contain content item 321 representing a universal resource locater entry box and content item 322 representing a back button to allow for navigation of the Internet. Further, for example, application window 330 representing a stock market tracking application can contain content item 331 representing a stock ticker or stock graph for a particular stock. In some embodiments, an application window (e.g., application window 310) contains content but does not necessarily contain a specific content item. For example, a notepad application can contain a page of text, but the application may not characterize the application window as containing a text element having a specific content type. Although the application window contains content, the application does not contain a particular content item that the application reports as having a specific content type.

Further, content items can change over time. At one time application window 320 can contain content items 321 and 322. At another time, application window can contain only content item 321 while content item 322 can be hidden or removed from application window 321 altogether.

A user can interact with application windows (e.g., application windows 310, 320, and 330) in various ways. A user can minimize an application window hiding it from view on user desktop 301. A user can maximize an application window making it as large as user desktop 301. A user can move application windows by dragging the top bar of the application window or can change the size of the application window by dragging a handle on a side or corner of the application window.

Additionally in manipulating application windows on user desktop 301, a user can cause some application windows to overlap. For example, application window 320 overlaps application windows 310 and 320 hiding portions of application windows 310 and 320 from view. A user can change the layering or order of overlap of the application windows. For example the user can click or otherwise move focus to application window 330 making application 330 the topmost window. In this example, application window 330 would be fully visible overlapping a portion of application 320.

As a user interacts with user desktop 301, the operating system (e.g., operating system 250 running on server 122) updates user desktop 301. When an application window (e.g., application window 310, 320, or 330) on user desktop 301 changes, the application corresponding to the application window instructs the operating system to update the display of the application window. The operating system can combine updates from all of the application windows compositing them into one unified display frame. In some embodiments, the operating system uses a GPU (e.g., GPU 225) for compositing and other graphic operations necessary to create a final display frame representing all updates to user desktop 301. After it is composited, the final display frame can be stored in a frame buffer (e.g., frame buffer 217) until output on the display device (e.g., display device 224) or forwarded to a remote client (e.g., remote client device 102) for display. These types of display mechanisms can be referred to as compositing window managers. Examples of compositing window managers include Quartz Compositor in Mac OS X, Desktop Window Manager in Microsoft Windows 7 and later versions, KWin, Compiz, and 3Dwm among others. By compositing the display frame within a compositing window manager instead of allowing applications to update a frame buffer directly, the operating system can exert more control over how application updates are represented in the final composited display frame. It is appreciated that embodiments consistent with the present disclosure are compatible with any display system where the output includes a display frame and are not limited to display systems classified as compositing window managers.

In a remote computing environment, including a virtualized computing environment for remote clients (e.g., client 102), the contents of a frame buffer (e.g., frame buffer 217) can be forwarded to the remote client and the remote client can present the display frame to the user. In environments where applications can write directly to the frame buffer, the graphics driver responsible for forwarding the display frame can use the additional information provided by the operating system to optimize the data sent to the remote client for display. With the advent of compositing window managers, however, in some embodiments, only the final display frame is provided to the graphics driver hindering previous methods of optimizing the display frame.

Some embodiments consistent with the present disclosure can be implemented in a forwarding graphics driver (e.g., graphics driver 251) used by the operating system. Instead of placing the composited frame in the frame buffer for display, the forwarding graphics driver can process the composited display frame and forward the results to a remote client (e.g., client 102). It is appreciated that other systems and components within the computing environment can implement embodiments consistent with the present disclosure. It is appreciated that these systems and components can be implemented in hardware, software, or some combination of hardware and software. Accordingly, the present disclosure of a forwarding graphics driver is exemplary.

Figure 4:
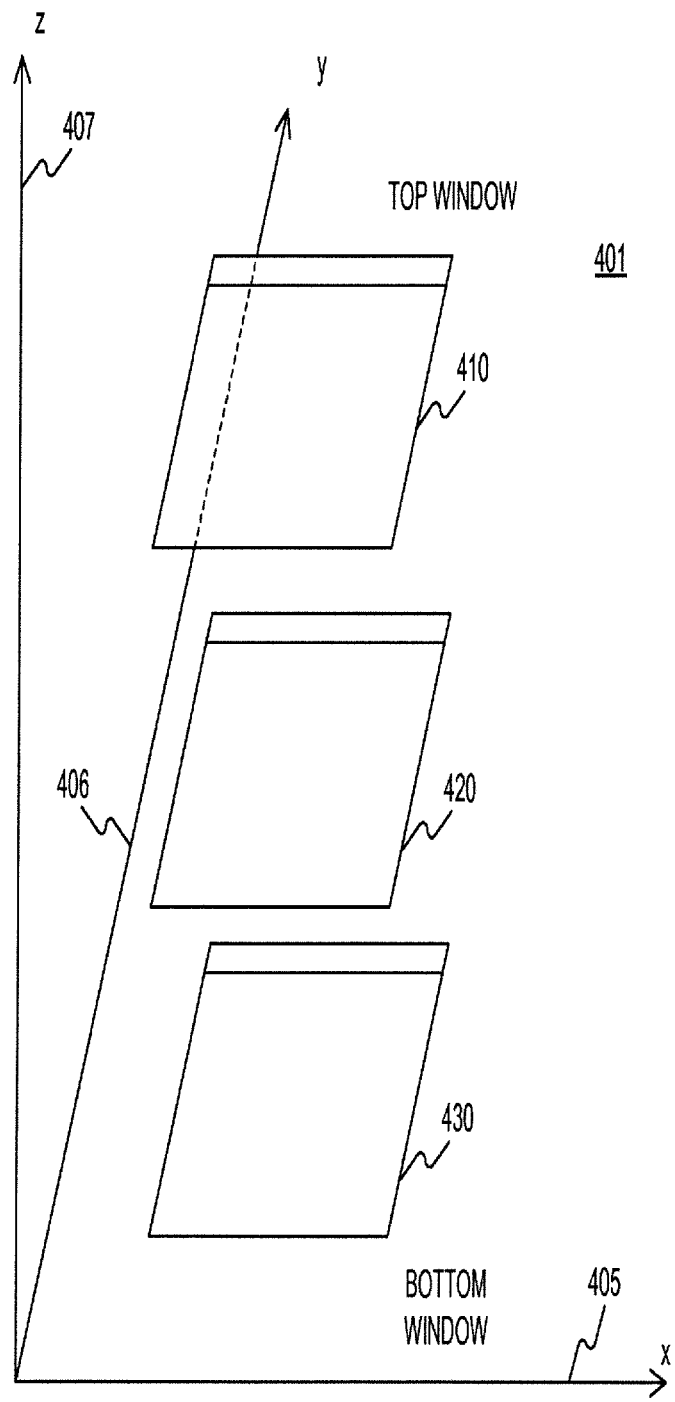
FIG. 4 illustrates an exemplary user desktop, consistent with embodiments of the present disclosure.

FIG. 4 illustrates an exemplary user desktop 401, consistent with embodiments of the present disclosure. Although user desktop 401 is presented as a two-dimensional surface, the placement of application windows (e.g., application windows 410, 420, and 430) can depend on three dimensions. The overlap that occurs when one application is placed over another can depend on the z-order of the application windows. As shown in FIG. 4, application windows 410, 420, and 430 can exist in three-dimensional space. The x (e.g., x axis 405) and y (e.g., y axis 406) dimensions of each window can represent the width and height of each application window when condensed into a two dimensional representation of the desktop like, for example, user desktop 301.

The z (e.g., z-axis 407) dimension can represent the z-order of application windows (e.g., application windows 410, 420, and 430). The z-order of the application windows can dictate the relative overlap among the application windows. The topmost window (e.g., application window 410) can have the highest z-order value while the bottommost window (e.g., application window 430) can have the lowest z-order value. When application windows 410, 420, and 430 of user desktop 401 are composited into a display frame by the operating system, the operating system and its various graphics system can use the z-order of the application windows to determine that application window 410 overlaps application window 420 and that application window 420 overlaps application window 430. As the user interacts with user desktop 401, the relative z-order of the application windows can change affecting the overlap in each composited display frame.

The operating system can provide the z-order to the other components of the computing environment. Particularly, a forwarding graphics driver can query the operating system to determine the z-order of the available application windows for a particular display frame. Before forwarding a composited frame to the frame buffer (e.g., frame buffer 217) or to a remote client (e.g., client 102), the forwarding graphics driver can process the composited display frame in combination with information from the operating system such as the z-order. This processing can allow for the forwarding graphics driver to retrieve information about the composited display frame to assist with compressing or encoding the composited display frame.

Figure 5A:
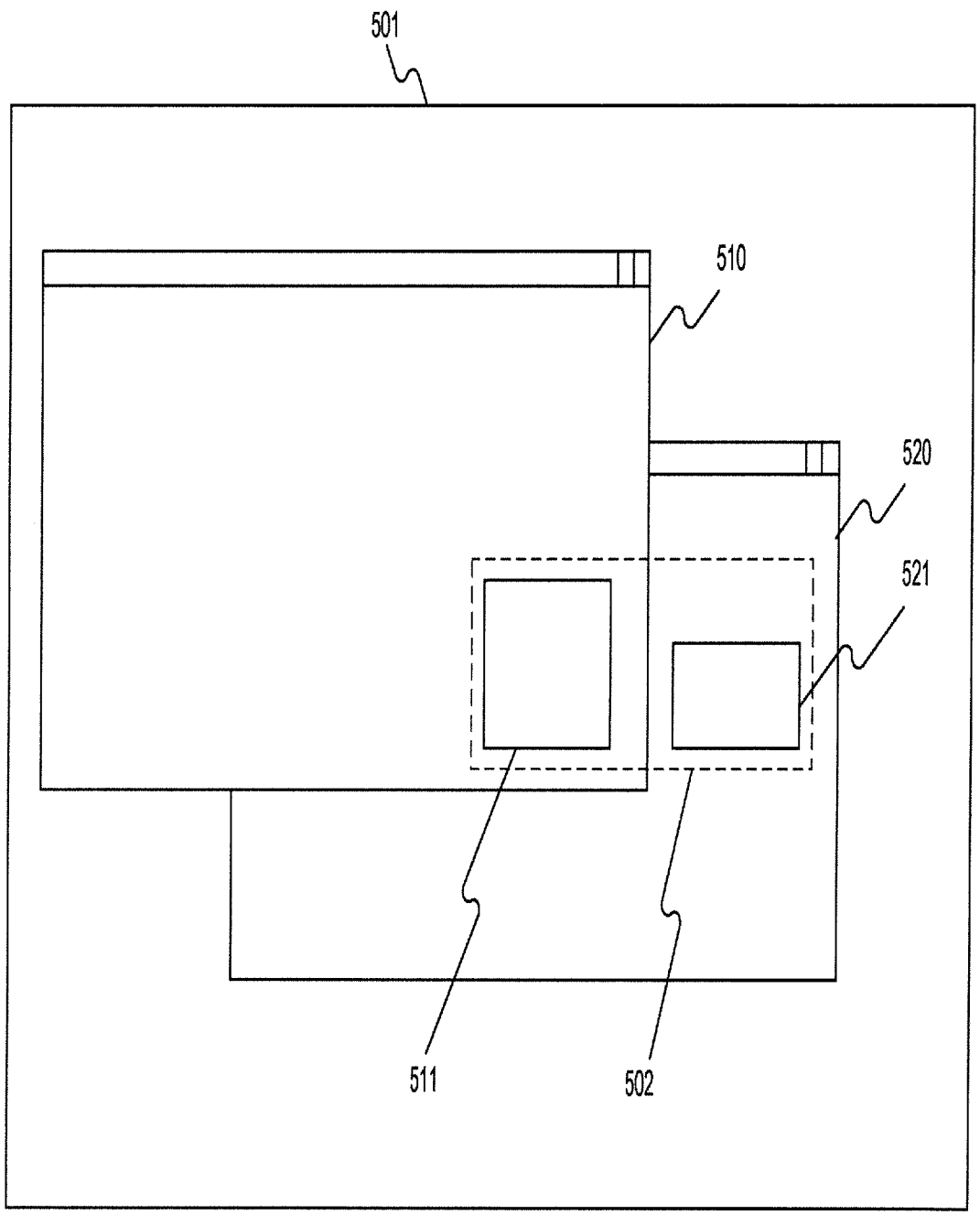
FIGS. 5A-5B illustrate an exemplary user desktop, consistent with embodiments of the present disclosure.
Figure 5B:
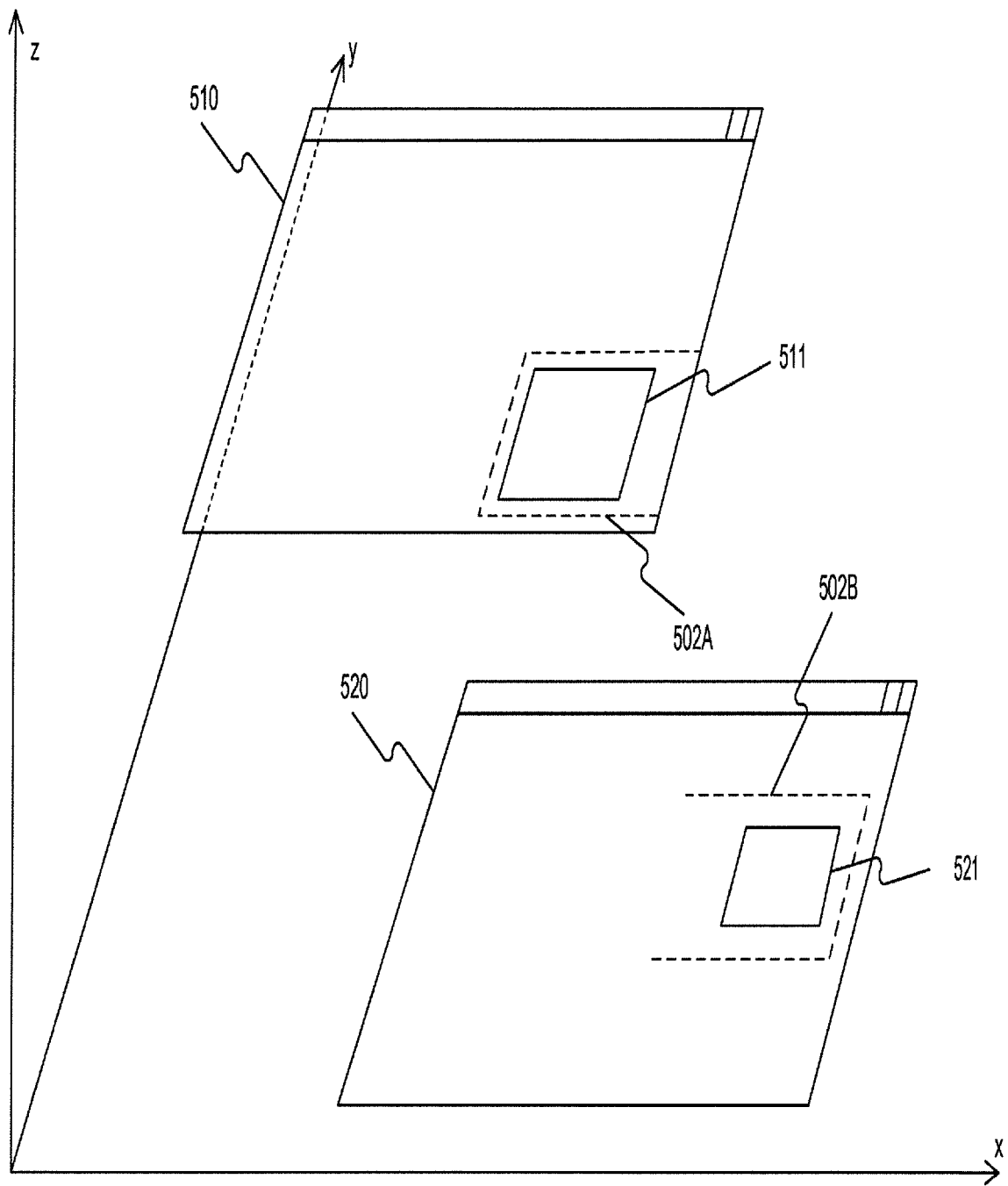

FIGS. 5A-5B illustrate an exemplary user desktop 501, consistent with embodiments of the present disclosure. FIG. 5A illustrates a two-dimensional view of exemplary user desktop 501 while FIG. 5B illustrates user desktop 501 in a three-dimensional view (similar to the view provided in FIG. 4). User desktop 501 can display application windows 510 and 520. In this exemplary embodiment, application window 510 contains content item 511, while application window 520 contains content item 521.

Modified region 502 can represent a portion of user desktop 501 that has changed since the display of the previous display frame. In some embodiments, the forwarding graphics driver (e.g. graphics driver 251) maintains a local video buffer or local frame buffer that contains previous display frames computed by the operating system. In these embodiments, when the operating system provides a new composited display frame to the forwarding graphics driver, the forwarding graphics driver compares the new frame with the previous display frame to determine the regions of user desktop 501 that have changed. In some embodiments, the operating system supplies the modified region of the display frame. After the forwarding graphics driver identifies modified regions (e.g., modified region 502), the forwarding graphics driver can further process the modified regions and can combine the results of the processing with information for the non-modified regions from the previously processed frame. The forwarding graphics driver can then forward the combined information to a frame buffer or a client (e.g., client 102).

In some embodiments, the forwarding graphics driver uses a differential reduction filter (e.g. differential reduction filter 252) to discover modified regions (e.g., modified region 502) of the composited frame. The forwarding graphics driver can recursively divide the frame into four quadrants until the frame is divided into regions measuring a specific size. For example, the recursive algorithm can divide the frame into blocks measuring 16 pixels high, by 16 pixels wide. A comparison between each block and the corresponding block in the previous display frame can reveal which blocks contain changed values. The forwarding graphics driver can stitch together any adjacent blocks that have changed into one or more modified regions (e.g., modified region 502). These modified regions represent the portions of the frame that have changed from the previous frame. It is appreciated that many different algorithms and processes for comparing two frames can be used to determine changed regions. The use of a differential reduction filter as disclosed is exemplary and any method that identifies at least one modified portion of a frame when compared to a previous frame is consistent with the present disclosure.

When forwarding a new frame to a remote client (e.g., client 102), the forwarding graphics driver responsible for forwarding the display can process the modified region (e.g., region 502) of the frame to determine the specific types of content and content items contained within the modified region (e.g., using content type detector 253). After the forwarding graphics driver determines the content types of the modified region, the forwarding graphics driver can utilize one or more appropriate compression or encoding schemes to optimize the transmission of the display frame. In some embodiments, the forwarding graphics driver encodes and forward only the modified portions of the display frame and instruct the remote client to draw the remaining, unmodified portion of the display frame using the previous frame.

For example, region 502 can represent the area of user desktop 501 that the forwarding graphics driver determined changed using, for example, a differential reduction filter (e.g., differential reduction filter 252). Within region 502, content item 511 and content item 521 can represent elements of application window 510 and 520 respectively that are changing. The forwarding graphics driver can analyze region 502, determine the type of the various content elements within the region, including the specific content types of content items 510 and 511, and determine the best compression or encoding mechanisms for forwarding region 502 to a remote client (e.g., client 102).

As shown in FIG. 5A, modified region 502 can exist entirely within the application window boundaries of application windows 510 and 520. The boundaries of application window 510 dictate that only a portion of modified region 502 intersects with application window 510. Although, as shown in FIG. 5A, the entirety of modified region 502 falls within the dimensions of application window 520, because of the overlap of application window 510 over application window 520, only a portion of modified region 502 actually covers a visible portion of application window 520. During processing of modified region 502, the forwarding graphics driver can effectively ignore the hidden portion of application window 520 and only process the area of application window 520 not hidden beneath application window 510. As shown in FIG. 5B, the overlap of the windows allows the forwarding graphics driver to split modified region 502 into modified region 502A which corresponds to application window 510 and modified region 502B which corresponds to application window 520.

When processing modified region 502 to determine specific content types and content items within the portion of the application window intersecting modified region 502, the forwarding graphics driver can utilize the z-order of the application windows to split modified region 502 into relevant sub-regions. For example, sub-region 502A of modified region 502 can correspond to application window 510 while sub-region 502B of modified region 502 can correspond to application window 520. Because of the relative z-order of application windows 510 and 520, the portion of application window 520 that would fall within modified region 502 is hidden and can be ignored.

The forwarding graphics driver can begin processing updated region 502 by obtaining a list of all of the application windows (e.g., application window 510 and 520) and their relative z-order. The processing can begin with the topmost application window based on the z-order of the application windows. In some embodiments, the topmost application will have the highest z-order of all application windows on user desktop 501. As shown in FIGS. 5A-5B, application window 510 can be the topmost window. The forwarding graphics processor can query application window 510 for its width and height dimensions (e.g., the x-axis 405 and y-axis 406 dimensions of the application window). The forwarding graphics driver can than determine that sub-region 502A of modified region 502 intersects application window 510. This correlation can be stored in memory (e.g., system memory 222) for later use. The forwarding graphics driver can than subtract sub-region 502A from updated region 502 leaving sub-region 502B for further processing.

The forwarding graphics driver can than continue processing modified region 502B with the next top-most application window based on relative z-order. As shown in FIG. 5B, the next topmost window can be application window 520. The forwarding graphics driver can repeat its steps, querying application 520 for its x and y dimensions and determining which portion of sub-region 502B falls within application window 520. Even though all of modified region 502 is contained within the boundaries of application window 520, because of the overlap, as previously described, between application window 510 and application window 520, only sub-region 502B must be considered after application window 520 is processed. Accordingly, the correlation between application window 520 and sub-region 502B can be stored in memory (e.g., system memory 222).

Because, no portion of modified region 502 remains uncorrelated after correlating sub-region 502A with application window 510 and correlating sub-region 502B with application window 520, the forwarding graphics driver can ignore any remaining application windows. In some embodiments, a portion of region 502 remains after all application windows have been considered. In these embodiments, any remaining portion of region 502 is correlated to user desktop 501. The forwarding graphics driver can filter application windows that are hidden or have no overlap with updated region 502 from the list of application windows to consider prior to processing. In some embodiments, after every portion of modified region 502 has been correlated with an application window, the forwarding graphics driver further process each correlated application window to determine specific content types within the application window. In some embodiments, the forwarding graphics driver can process each application window as each window is correlated with a sub-region of region 502 instead of waiting until all sub-regions of region 502 are correlated with an application window.

Because every portion of modified region 502 is correlated to an application window, by iterating over the stored correlations between sub-regions (e.g., sub-regions 502A and 502B) of modified region 502 and their corresponding application windows, the forwarding graphics driver can query each application window obtaining information about all of the content types contained within modified region 502.

Figure 6:
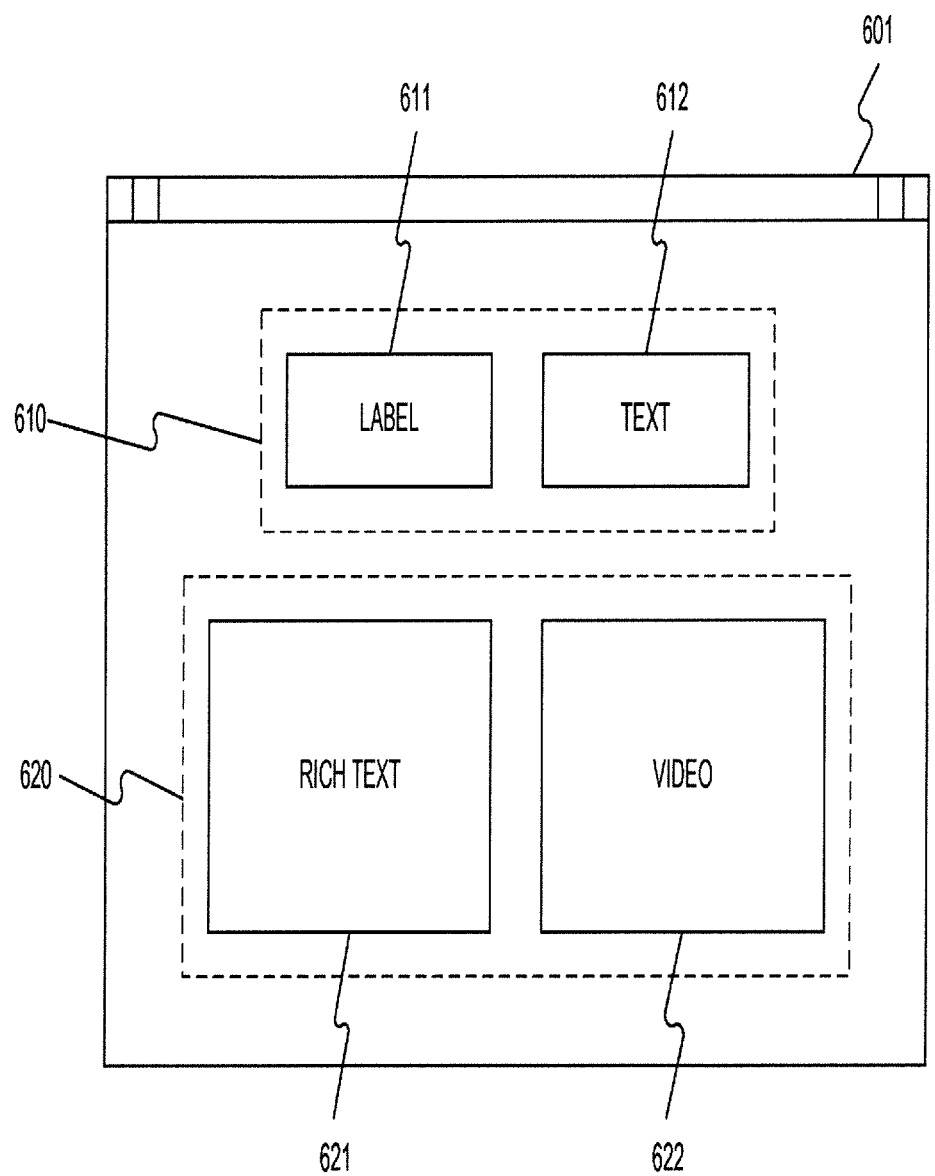
FIG. 6 illustrates an exemplary application window, consistent with embodiments of the present disclosure.

FIG. 6 illustrates an exemplary application window 601, consistent with embodiments of the present disclosure. Application window 601 can be an application window on a user desktop (e.g., application window 510 or 520 on user desktop 501). Further application window 601 can be correlated with portions of a modified region (e.g., modified region 502) of a frame. As shown in FIG. 6, sub-region 610 and sub-region 620 can be sub-regions of a modified region of a frame. Further, sub-region 610 can contain content items 611 and 612. Sub-region 620 can contain content items 621 and 622. In some embodiments, one or more of 611, 612, 620, and 621 can be the same content type. In some embodiments one or more of content items 611, 612, 621 and 622 can be different content types.

The forwarding graphics driver (e.g. graphics driver 251) can process sub-region 610 by asking application window 601 for information about the contained content types within sub-region 610. Content types can indicate the structure of the information provided in a content item or application window. Content types can indicate different classifications of content such as an image, a video, an audio element, text, an interactive control, or another element that can be part of an application window. Application window 601 can indicate that content item 611 is a "LABEL" content type and that content item 612 is a "TEXT" content type. Application window 601 can further indicate that the remaining portion of sub-region 610 is part of the application window background or is a different content type altogether. In some embodiments, because content items 611 and 612 can be specifically identified, content items 611 and 612 can be referred to as deterministic regions of sub-region 610. In some embodiments, the remaining portion of sub-region 610 is considered a non-deterministic region because a known or definite content-type cannot be determined.

Modern operating systems can provide application programming interfaces or other mechanisms for querying application windows about the contained content types. For example, web browsers may provide access to information from the Document Object Model ("DOM") used to represent the rendered web page. The DOM information can provide an indication of a particular element on a webpage that is in view. Additionally, standard control elements, such as a text entry box, can indicate the content type of the control. A text entry box can indicate that its content type is text. A password entry box can indicate that its content type is obfuscated text. Other examples of controls or mechanisms application windows can provide for querying content types include Active Accessibility Notifications, specialized compound controls like flash-based or ActiveX-based video rendering controls, and custom built controls or properties. In some embodiments, the forwarding graphics driver can maintain a lookup table used to determine a content type based on properties of the content or content item or the application itself. In these embodiments, this table can further assist in the translation between the content type reported by an application and the content type used by the forwarding graphics driver to choose an encoding mechanism.

Similarly to sub-region 610, the forwarding graphics driver can query application window 601 about the content items and content types within sub-region 620. Application window 601 can indicate that content items 621 and 622 contain rich-text and video respectively. Further, in some embodiments, the portions of sub-region 620 occupied by content items 621 and 622 can be considered deterministic regions. In some embodiments, application window 601 can further indicate a content type for the remainder of sub-region 620 or sub-region 620 can be considered a non-deterministic region.

After the content types and sub-region characteristics are established, the forwarding graphics driver can choose the proper compression and encoding for each specific area of the display frame. For example, areas of the frame assigned a content type of text can undergo little or no compression to minimize degradation of the content. Areas of the display frame assigned a content type of an image or video may undergo greater compression because exact precision is not as critical to the user experience when viewing images or video. Further, an image could use one method of compression suitable for static images while a video content item can be compressed using a compression technique more suitable to video frames.

In some embodiments, the compression mechanism used can be influenced by external factors such as user defined settings or available network bandwidth. In some embodiments, the same compression mechanism does not necessarily need to be used for content items having the same content type. Different images or videos can result in different compression mechanisms depending on the circumstances and characteristics of the content types and application windows. Application windows that are active or have a higher z-order can result in more or less compression depending on the requirements of the system. As previously described, compression and encoding decisions can be based on a static table correlating content types to compression and encoding mechanisms.

Compression and encoding decisions can be based on a variety of different factors that include the deterministic or non-deterministic nature of various regions of the display frame. Deterministic regions can be regions where the forwarding graphics driver can determine a content type for the region. Non-deterministic regions can be regions where the forwarding graphics driver cannot determine a specific content type for the region. In some embodiments, the forwarding graphics driver can mark the content-type of non-deterministic regions as simply non-deterministic. Because a specific content type is known for deterministic regions, the forwarding graphics driver can utilize a variety of mechanisms for assigning a particular encoding or compression to the deterministic region. For example, the forwarding graphics driver can use a lookup table to correlate the specific content type with an encoding or compression type. Further, the forwarding graphics driver can choose a default or pre-determined compression or encoding strategy for non-deterministic content types and regions.

Figure 7:
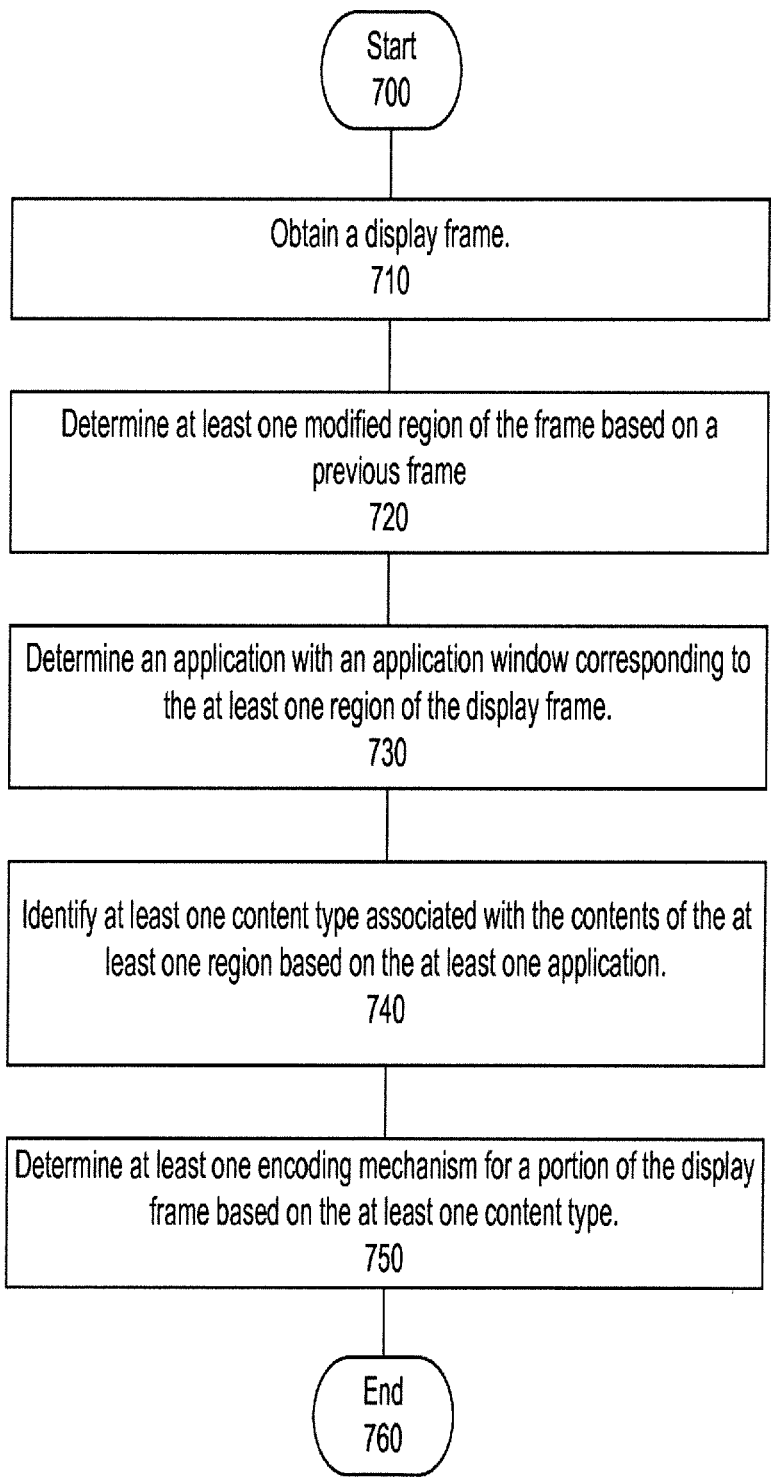
FIG. 7 is a flowchart of an exemplary method for detecting content types and window regions, consistent with embodiments of the present disclosure.

FIG. 7 is a flowchart of an exemplary method for detecting content types and window regions, consistent with embodiments of the present disclosure. It will be readily appreciated that the illustrated procedure can be altered to delete steps or further include additional steps. After initial step 700, the forwarding graphics driver (e.g., graphics driver 251) can obtain a new display frame (step 710). In some embodiments the frame will come directly from a frame buffer (e.g., frame buffer 216). The obtained frame can be a bitmap ready for display on a display device (e.g., display device 224) or for forwarding to a remote client (e.g., client device 102). The display frame can represent a composite made by the operating system including all screen updates from the application windows (e.g., application windows 310, 320, 330, 410, 420, 430, 510, 520 and 601) on the user desktop (e.g., user desktop 301, 401, and 501).

After obtaining the display frame, the forwarding graphics driver can determine (step 720) a region of the frame that is modified. The forwarding graphics driver can maintain a local buffer of past frames. The obtained display frame can be compared to a previous frame using various mechanisms such as a differential reduction filter to determine regions of the obtained frame that have been modified.

The forwarding graphics driver can determine (step 730) an application with an application window (e.g., application window 310, 330, 410, 420, 430, 510, 520 or 601) that overlaps with at least a portion of the modified frame region (e.g., modified region 502, 610, and 620). The forwarding graphics driver can query application windows for their respective width, height, and z-order dimensions and locations. The forwarding graphics driver, in some embodiments, can use the z-order dimensions to determine areas of application windows that are hidden from view because of overlap between application windows. The forwarding graphics drivers can compare the width and height of application windows with the width, height, and location dimensions of the modified regions to find intersection between the application windows and the modified region.

After an overlap between the modified region and application window is found, the forwarding graphics driver can identify (step 740) the content types contained within the application window. The application window can provide APIs, data structures, or other mechanisms to assist with determining the specific content types falling within the portion of the modified region that overlaps the application window (e.g., modified regions 502A, 502B, 610, and 620). An application window can contain multiple content types. The forwarding graphics driver can use the information provided by the application window to make a determination on specific portions (e.g., content items 321, 322, 331, 511, 521, 611, 612, 621, and 622) of the application window that correspond to specific content types. Further, the forwarding graphics driver can determine which areas of the application window can be deterministically identified as a content type and which areas cannot. Exemplary determining (e.g., step 730) and identifying (e.g., step 740) steps are illustrated in FIG. 8 below.

Referring back to FIG. 7, after identifying the content types of the portions of the application window corresponding to the modified region of the display frame, the forwarding graphics driver can determine (step 750) the most appropriate encoding or compression mechanism for the specific content types. Certain types of content may require different compression and/or encoding algorithms. For example, to maintain readability, textual content types can undergo limited amounts of compression. Conversely, graphics and video content types may undergo aggressive compression and/or encoding that significantly reduce bandwidth requirements while still providing a quality user experience.

The forwarding graphics driver can further use information in addition to the content type to determine the encoding and/or compression scheme for a portion of the frame. For example, the forwarding graphics driver can apply more aggressive compression to windows in the background having a low z-order and apply less aggressive compression to windows having a higher z-order that will appear in the foreground in an attempt to provide higher quality for the application windows that are more likely to be in use by the user. Further, the forwarding graphics driver can consider externally defined settings or bandwidth considerations to determine what compression and/or encoding should be applied to various content types. After the encoding or compression determinations are made, the forwarding graphics driver can encode the display frame, using the encoding or compression determinations to guide the encoding for specific portions of the display frame. The forwarding graphics driver can forward the encoded display frame to the client for display with any additional information that can assist in the optimization and display of the display frame.

Figure 8:
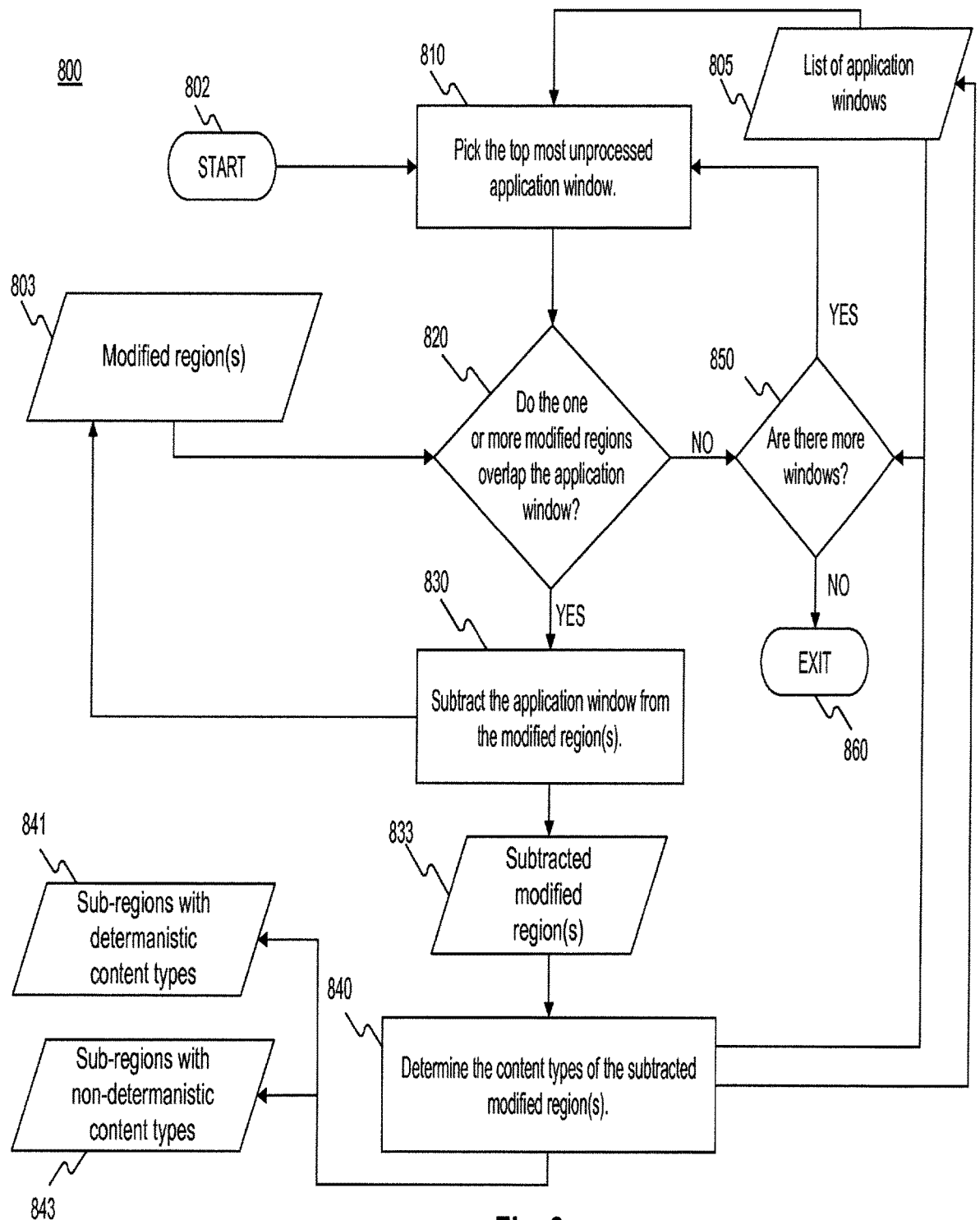
FIG. 8 is a flowchart of an exemplary method for detecting content types and window regions, consistent with embodiments of the present disclosure.

FIG. 8 is a flowchart of an exemplary method 800 for detecting content types and window regions, consistent with embodiments of the present disclosure. A forwarding graphics driver (e.g., graphics driver 252) can perform method 800 within a sub-component (e.g., in content type detector 253). It will be readily appreciated that the illustrated procedure can be altered to delete steps or further include additional steps. It is also appreciated that the forwarding graphics driver can access a stored set of modified display frame regions 803 (e.g., determined by using a process such as differential reduction filter 252) and a stored list of application windows 805. These data structures can be stored in a storage medium (e.g., system memory 222, storage 228, or cache 240). After initial step 802, the forwarding graphics driver can pick (step 810) the topmost, unprocessed application window (e.g., application window 320, 410, and 510) using the stored list of application windows 805. In some embodiments, stored list of application windows 805 initially contains all of the application windows on a user desktop (e.g., user desktop 301, 401, and 501). In some embodiments, stored list of application windows 805 will contain only those application windows (e.g., application windows 320 and 330) that overlap a modified region (e.g., modified region 502, 610, and 620) of the display frame representing a user desktop (e.g., user desktop 301, 401, and 501). In these embodiments application windows (e.g., application window 310) that do not overlap the modified region of the display frame are excluded before the content types are determined. Further, the selected application window can be marked as being processed in stored list of application windows 805. In some embodiments, the application window is removed from list of application 805 windows altogether.

After an application window is selected, the application window can be queried (step 820) to determine the coordinates representing the location and size of the application window. Additionally, the forwarding graphics driver can retrieve stored modified regions 803 of the display frame. Modified regions 803 can be a list of all regions of the display frame that have been modified from a previous display frame (e.g., modified regions 502, 610, and 620). The first time step 820 is reached, modified regions 803 will contain all portions of the display frame that have been modified since the previous display frame.

If the modified regions do not overlap the application window, the forwarding graphic driver can query (step 850) stored list of application windows 805 to determine if the method should continue. If there are additional unprocessed windows in stored list of application windows 805, the method continues at step 810. If there are not, the method exits (step 860).

If the modified regions do overlap any portion of the application window, method 800 can calculate the regions of intersection. The forwarding graphics driver can subtract (step 830) the overlapping region from the modified regions. The subtracted region can be output as subtracted region 833. For example, as shown in FIG. 5A-B, the subtracted region can be region 502A determined by subtracting application window 510 from modified region 502. The remainder of the modified region can be stored as modified regions 803. For example, as shown in FIG. 5B, the remaining modified region is region 502B. The forwarding graphics driver can store region 502B as modified regions 803. In some embodiments, the existing modified regions 803 are overwritten. In some embodiments, the modified regions 803 are updated to indicate which regions have not yet been found to overlap an application window.

The forwarding graphics driver can take the subtracted region 833 and determine (step 840) the content types of the content within the region in a manner consistent with the present disclosure. For example, the forwarding graphics driver can query the application window and data structures within the application window to determine the specific content types of content and content items within the application window. The content type determination can update a list containing sub-regions with deterministic content types 841 and sub-regions with non-deterministic content types 843. For example, as shown in FIG. 6, content items 611, 612, 621 and 622 are deterministic content types and could be stored with their corresponding content type in sub-regions with deterministic content types 841. Further, as shown in FIG. 6, the remaining sub-regions of regions 610 and 620 can be stored in sub-regions with non-deterministic content types 843. The sub-regions with deterministic content types 841 can further include an indication of the specific content type of each sub-region in the data structure. These outputs can be stored for later use (e.g., in system memory 222, storage 228, or cache 240). If method 800 has not yet updated list of application windows 805 to indicate which application window is being processed, then the forwarding graphics driver can update list of application windows 805 after step 840.

After determining the content types, method 800 can query (step 850) list of application windows 805 to determine if additional application windows need processing. If additional application windows need processing, method 800 can continue at step 810. If no additional application windows need processing, method 800 can exit at step 860.

At the end of method 800 (step 860), the forwarding graphics driver can take the outputs from method 800 and use those outputs to determine the desired encoding and/or compression mechanisms for the display frame (e.g., such as determining step 750 as shown in FIG. 7). Each of the sub-region and deterministic content type correlations in sub-regions with deterministic content types 841 can be used to encode regions of the frame having known or deterministic content types. Similarly, a default encoding or compression can be applied to each of the sub-region and non-deterministic content type correlations in sub-regions with non-deterministic content types 843. After all modified regions of the frame have been encoded, the forwarding graphics driver can forward the encoded frame along with information indicating which regions are encoded with different encoding mechanisms for display by a remote client (e.g., client 102). When forwarding the display frame, the forwarding graphics driver can further indicate which regions were not modified.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

That which is claimed is:
1. A computing device comprising:
  at least one processor configured to:
    obtain a display frame;
    determine at least one modified region of the display frame;

determine at least one application having an application window with a portion overlapping the at least one modified region of the display frame;

subtract the overlapping portion of the application window from the at least one modified region to define a difference region;

identify a content type of the difference region of the display frame from among a plurality of different content types;

select a given encoding type for at least a portion of the display frame based on the identified content type of the difference region; and encode the at least one portion of the display frame using the given encoding type.

2. The computing device of claim 1 wherein the determination of the at least one application having an application window corresponding to the at least one modified region is further based on a z-order of the application window.

3. The computing device of claim 1 wherein the modified region of the display frame is determined based on a comparison with a previous display frame.

4. The computing device of claim 1 wherein the determination of the at least one modified region of the display frame utilizes a differential reduction filter.

5. The computing device of claim 1 wherein the given encoding type is selected for the entire display frame.

6. A method performed by a computing device including at least one processor and comprising:

obtaining a display frame;

determining at least one modified region of the display frame;

determining at least one application having an application window with a portion overlapping the at least one modified region of the display frame;

subtracting the overlapping portion of the application window from the at least one modified region to define a difference region;

identifying a content type of the difference region of the display frame from among a plurality of different content types; and selecting a given encoding type for at least a portion of the display frame based on the identified content type of the difference region; and encoding at least one portion of the display frame using the given encoding type.

7. The method of claim 6 wherein determining the at least one application having an application window corresponding to the at least one modified region is further based on a z-order of the application window.

8. The method of claim 6 wherein the modified region of the display frame is determined based on a comparison with a previous display frame.

9. The method of claim 6 wherein determining at least one modified region of the display frame utilizes a differential reduction filter.

10. The method of claim 6 wherein the given encoding type is selected for the entire display frame.

11. A non-transitory computer readable storage medium storing a set of instructions that are executable by at least one processor of a computing device to cause the computing device to perform a method comprising:

obtaining a display frame;

determining at least one modified region of the display frame;

determining at least one application having an application window with a portion overlapping the at least one modified region of the display frame, wherein the at least one content type includes textual content;

subtracting the overlapping portion of the application window from the at least one modified region to define a difference region;

identifying a content type of the difference region of the display frame from among a plurality of different content types; and selecting a given encoding type for at least a portion of the display frame based on the identified content type of the difference region; and encoding at least one portion of the display frame using the given encoding type.

12. The non-transitory computer readable storage medium of claim 11 wherein determining at least one application having an application window corresponding to the at least one modified region is further based on a z-order of the application window.

13. The non-transitory computer readable storage medium of claim 11 wherein the modified region of the display frame is determined based on a comparison with a previous display frame.

14. The non-transitory computer readable storage medium of claim 11 wherein determining at least one modified region of the display frame utilizes a differential reduction filter.

15. The non-transitory computer readable storage medium of claim 11 wherein the given encoding type is selected for the entire display frame.

* * * * *